United States Patent
Lee et al.

(10) Patent No.: US 7,818,366 B2
(45) Date of Patent: Oct. 19, 2010

(54) METHOD AND APPARATUS FOR PROVIDING MULTIMEDIA BROADCAST/MULTICAST SERVICE IN MOBILE COMMUNICATION SYSTEM

(75) Inventors: Young Dae Lee, HaNam-shi (KR); Myung Cheul Jung, Seoul (KR); Min Jung Kim, Ujwang-shi (KR); Yong Woo Shin, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 1034 days.

(21) Appl. No.: 10/956,443

(22) Filed: Sep. 30, 2004

(65) Prior Publication Data

US 2005/0083884 A1    Apr. 21, 2005

(30) Foreign Application Priority Data

Oct. 2, 2003    (KR) .................. 10-2003-0068942

(51) Int. Cl.
*G06F 17/00* (2006.01)
*H04L 7/00* (2006.01)

(52) U.S. Cl. ............... 709/203; 709/224; 709/227; 370/328; 455/445; 455/462

(58) Field of Classification Search ............ 709/203, 709/226, 229, 227, 224; 455/456.1, 456.5, 455/517, 519, 500
See application file for complete search history.

(56) References Cited

U.S. PATENT DOCUMENTS

| | | | |
|---|---|---|---|
| 5,987,011 A | 11/1999 | Toh | |
| 6,351,467 B1 * | 2/2002 | Dillon | 370/432 |
| 6,374,112 B1 | 4/2002 | Widegren et al. | |
| 6,466,556 B1 | 10/2002 | Boudreaux | |
| 6,477,384 B2 * | 11/2002 | Schroderus et al. | 455/500 |
| 6,636,491 B1 * | 10/2003 | Kari et al. | 370/328 |
| 6,898,433 B1 * | 5/2005 | Rajaniemi et al. | 455/456.1 |
| 6,912,402 B1 * | 6/2005 | Haumont et al. | 455/519 |
| 7,013,141 B2 * | 3/2006 | Lindquist et al. | 455/435.1 |
| 2003/0002525 A1 | 1/2003 | Grilli et al. | |

(Continued)

FOREIGN PATENT DOCUMENTS

CN    1256053    6/2000

(Continued)

OTHER PUBLICATIONS

Min, Seung Jae et al.; "Study For Mobility Support Of Multicast Service in Wireless ATM Environment"; Hanyang University; Apr. 1999.

(Continued)

*Primary Examiner*—Khanh Q Dinh
(74) *Attorney, Agent, or Firm*—Lee, Hong, Degerman, Kang & Waimey

(57) ABSTRACT

A method and apparatus is provided for providing one or more point-to-multipoint services, such as a multimedia broadcast/multicast service (MBMS), to one or more mobile terminals, or user equipment (UE). When one or more mobile terminals move to a new area of a mobile communication system managed by a different network element after joining a service, information is transmitted between network elements in a manner that facilitates the continued reception of the service by the mobile terminals that have moved while conserving network resources and increasing efficiency of the mobile communication system.

20 Claims, 8 Drawing Sheets

U.S. PATENT DOCUMENTS

2006/0156370 A1 * 7/2006 Parantainen ................ 725/132

FOREIGN PATENT DOCUMENTS

| CN | 1316168 | 10/2001 |
|---|---|---|
| EP | 1 204 290 A2 | 5/2002 |
| JP | 2004-135292 | 4/2004 |
| KR | 10-2002-0011433 | 8/2002 |
| KR | 1020020064987 | 8/2002 |
| KR | 1020030074016 | 9/2003 |
| RU | 2157598 | 10/2000 |
| WO | 03/063418 | 7/2003 |

OTHER PUBLICATIONS

Ericsson; "UTRAN Architectural Aspects in Relation with MBMS"; TSG-RAN WG2 Meeting #30, Doc. No. TSGR2#30(02)1635; Jun. 24, 2002.

* cited by examiner

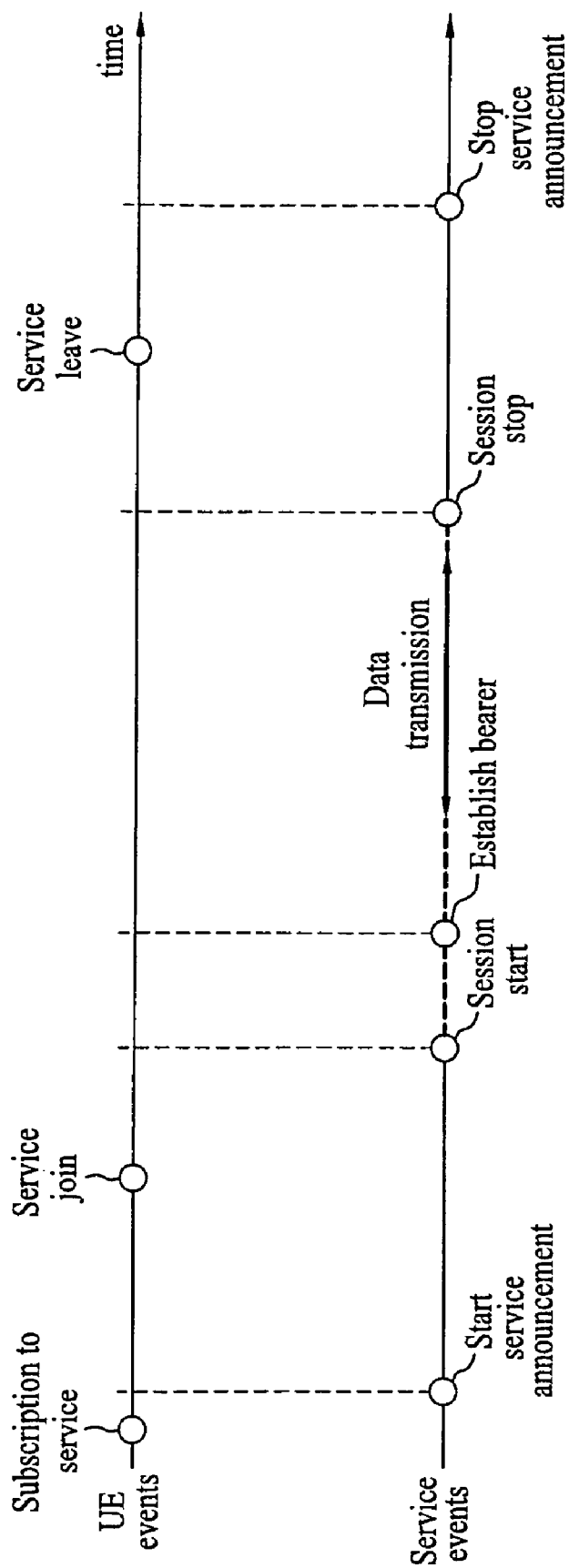

METHOD AND APPARATUS FOR PROVIDING MULTIMEDIA BROADCAST/MULTICAST SERVICE IN MOBILE COMMUNICATION SYSTEM

CROSS-REFERENCE TO RELATED APPLICATIONS

This application claims the benefit of Korean Application No. 10-2003-0068942 filed on Oct. 2, 2003, which is hereby incorporated by reference.

BACKGROUND OF THE INVENTION

1. Field of the Invention

The present invention relates to a method and apparatus for providing one or more point-to-multipoint services, such as a multimedia broadcast/multicast service (MBMS), to one or more mobile terminals, or user equipment (UE). More particularly, the present invention relates to a method and apparatus for providing one or more services such that, when one or more mobile terminals move to a new area of a mobile communication system managed by a different network element after joining a service, information is transmitted between network elements in a manner that facilitates the continued reception of the service by the mobile terminals that have moved while conserving network resources and increasing efficiency of the mobile communication system.

2. Discussion of the Related Art

The universal mobile telecommunications system (UMTS) is a third-generation mobile communication system that has evolved from the global system for mobile communications (GSM) system and is directed to providing enhanced services based on the GSM core network and wideband code-division multiple-access technologies.

A conventional UMTS network 1 structure is illustrated in FIG. 1. One mobile terminal 2, or user equipment (UE), is connected to a core network 4 through a UMTS terrestrial radio access network (UTRAN) 6. The UTRAN 6 configures, maintains, and manages a radio access bearer for communications between the UE 2 and core network 4 to meet end-to-end quality-of-service requirements.

The UTRAN 6 consists of at least one radio network subsystem 8, including one radio network controller (RNC) 10 acting as an access point to the core network, and at least one Node B 12 managed by a corresponding RNC. The RNCs 10 are logically classified as controlling RNCs, which allocate and manage common radio resources for a plurality of UEs 2 of a cell, and serving RNCs, which allocate and manage dedicated radio resources for a specific UE of a cell. Each Node B 12 manages at least one cell.

Whenever a specific UE 2 is active in a UMTS network 1, there is one RNC 10 acting as its serving RNC 10 (SRNC). The SRNC 10 is the access point to a core network 4 for data transmission of the UE 2. Any other RNC 10 may act as a drift RNC 10 (DRNC). A connection of one UE 2 to the UTRAN 6 may be achieved by the SRNC 10 alone, for example without a drift RNC, but may additionally require one or more DRNC.

An RNC 10 connected to one or more Node Bs 12 via the Iub interface controls the radio resources of the Node Bs and is the controlling RNC. The controlling RNC 10 creates a point-to-multipoint relationship with the corresponding Node Bs 12 and controls traffic load and congestion within the corresponding cells and controls code acceptance and code allocation for new radio links.

At any time, information may be transferred between a UE 2 and the core network 4 via the UTRAN 6. Generally, the transfer of information occurs via one RNC 10, for example the SRNC.

However, since a UE 2 is mobile, there are times when the UE moves to a new area, or cell, of a Node B 12 managed by a different RNC 10. When a UE moves to a cell managed by a different RNC 10, the function of a DRNC is necessary. The UE 2 is connected to the SRNC 10 through the DRNC.

FIG. 2A illustrates a portion of the UMTS network 1 of FIG. 1 when a UE 2 is connected to the core network 4 via an SRNC (R1) 10 alone. FIG. 2B illustrates a portion of the UMTS network 1 of FIG. 1 when a UE 2 is connected to the core network 4 via an SRNC (R1) 10 and a DRNC (R2).

It should be noted that a UE 2 initially completes its connection to the core network 4 via the SRNC (R1) 10 as illustrated in FIG. 2A. However, when the UE 2 moves to a cell managed by the DRNC (R2) 10, the connection between the UE and core network 4 is established through the DRNC (R2) which is connected to the SRNC (R1) via the Iur interface. The SRNC (R1) 10 still manages the UE 2 and acts as the access point to the core network 4 while the DRNC (R2) contributes by allocating codes as shared resources and routing user data. The SRNC (R1) 10 and DRNC (R2) are distinguished by the logic related to a specific UE 2 and its specific Node B 12 connection state.

The SRNC (R1) 10 operates with regard to data input via a radio interface or data transmitted to the UE 2 and allocates radio resources appropriate for providing services. Radio resource management functions are control functions related to a specific UE 2 and include transmission channel establishment, handover decisions and open loop power control.

A radio resource control (RRC) layer is defined on a third layer of the radio interface protocol for each RNC 10 and UE 2. The RRC layer is responsible for controlling transport and physical channels in association with establishment, reconfiguration, and release of a radio bearer, which is a service provided by a second layer of radio interface protocol and which is established in order to transfer data between a UE 2 and the core network 4. The establishment of a radio bearer defines the behavior of a protocol layer, for example the channel characteristics needed to provide a specific service, and is a process of setting up an operational method of the service and its parameters.

When an RRC layer of a specific UE 2 and an RRC layer of an RNC 10 are connected for the exchange of RRC messages, the UE is said to be in an RRC-connected mode. In the absence of such a connection, the UE 2 is in the RRC idle mode. The serving RNC (R1) 10 of a UE 2 is determined when an RRC connection to an RNC is established. The RNC 10 recognizes and manages the corresponding UE 2 according to a cell unit.

An RNC 10 is unable to recognize the presence of UEs 2 in the RRC-idle mode. The core network 4 manages UEs 2 in the RRC-idle mode, specifically by the MSC or SGSN, according to location or routing area, which is an area greater than one cell. Although a UE 2 in the RRC-idle mode may receive multimedia broadcast/multicast service (MBMS) data, the UE must be in the RRC-connected mode to receive general mobile communication services, such as voice and packet data.

An MBMS is a service providing streaming or background service to a plurality of UEs 2 via downlink-dedicated MBMS bearer services. In the UTRAN 6, an MBMS bearer utilizes point-to-point (p-t-p) or point-to-multipoint (p-t-m) radio bearer services.

As the name implies, an MBMS may be performed in a broadcast mode or a multicast mode. In the broadcast mode, multimedia data is transmitted to all users within a service area, for example the domain where the broadcast service is available. In the multicast mode, multimedia data is transmitted to a specific user group within a service area, for example the domain where the multicast service is available.

FIG. 3 illustrates the concurrent events of a specific UE 2 and a specific MBMS in a multicast mode transmission. A UE 2 desiring to receive an MBMS completes a subscription procedure in order to establish a relationship between the UE and the provider of the MBMS. All subscribing UEs 2 should receive a start service announcement provided by the core network 4 which corresponds to the specific MBMS and informs subscribing UEs 2 of a list of services to be provided and associated information.

To participate in the specific group of UEs 2 receiving a specific multicast service, a UE "joins" a multicast group by notifying the core network 4 of an intention to receive the specific multicast service. To terminate participation in the group, a UE 2 performs a "leave" operation. Subscription, joining, and leaving are performed by each UE 2 for each service and may be carried out at any time prior to, during, or after the data transfer.

While the specific MBMS is in progress, for example at some time after transmission of a "session start" command but before a "session stop" command is received, one or more sessions of the service may sequentially take place. A session corresponds to a period of data transfer. When an MBMS data source has MBMS data ready for transfer, the core network 4 informs the RNC 10 of a session start. When it is determined that there will be no data transmission available for an extended period of time, for example a long idle period, the core network 4 informs the RNC 10 of a session stop. Data transfer for the specific MBMS can be performed only for the time between the session start and the session stop and only UEs 2 having joined the multicast group for the specific MBMS are enabled to receive the MBMS data.

In the session start process, the RNC 10 transmits an MBMS notification to participating, or joined, UEs 2 after receiving a session start from the core network 4. The MBMS notification is transmitted at least once before MBMS data transmission and informs the UEs 2 that the data transfer of a specific MBMS in a prescribed cell is imminent.

Upon a session start, the RNC 10 recognizes and performs a count of the joined UEs 2 within a specific cell. As a result of the counting process, the RNC 10 determines whether to establish a point-to-point or point-to-multipoint radio bearer according to a set threshold. The RNC 10 establishes a point-to-point MBMS radio bearer if the number of joined UEs 2 is below the threshold and sets up a point-to-multipoint MBMS radio bearer if the number of joined UEs 2 exceeds the threshold.

Once the MBMS radio bearer is determined, the RNC 10 informs the UEs 2 accordingly. If a point-to-point radio bearer is determined, all the joined UEs 2 for a specific service are requested to transition to the RRC-connected mode to receive MBMS data. On the other hand, such a transition is unnecessary if a point-to-multipoint radio bearer is determined since reception via a point-to-multipoint radio bearer is enabled even for UEs 2 in the RRC idle mode. If the counting process determines that there is no UE 2 desiring to receive the service, no radio bearer is established and no MBMS data is transmitted in order to avoid the unnecessary consumption of radio resources.

When the MBMS data for one session of the specific MBMS is received from the core network 4, the RNC 10 transmits the data using the established radio bearer. Upon receiving the session stop, the RNC 10 releases the established radio bearer. A new radio bearer must be established for each subsequent session. If there is no further session scheduled, a stop service announcement is transmitted.

The MBMS transmission process is executed between the UEs 2 and the core network 4, as well as higher layers, for each service via the controlling RNC 10. If a UE 2 remains in a cell managed by the RNC 10 at the time of RRC connection, the MBMS transmission process is executed according to the configuration illustrated in FIG. 2A, for example using only the serving RNC (R1) 10. Should a drift RNC (R2) 10 be necessary, the configuration illustrated in FIG. 2B is applicable and the UE 2 is connected to the higher layers via at least one drift RNC (R2) 10 and the serving RNC (R1).

In the conventional MBMS transmission process, an RNC 10 providing a specific MBMS recognizes and manages a UE 2 in the RRC-connected mode among UEs joining a specific MBMS in each cell. The RNC 10 manages a list of UEs 2 in the RRC-connected mode for each MBMS in each cell in order to identify each UE that has joined the specific MBMS by its radio network temporary identifier (RNTI).

An MBMS attach process is performed for UEs 2 in the RRC-connected mode that move from a cell managed by the serving RNC (R1) 10 to a cell managed by a drift RNC (R2). The attach process is performed when an MBMS that a moving UE 2 has joined is in progress during the move or when a session start command is received from the core network 4 after the UE has moved.

FIG. 4 illustrates a conventional MBMS attach process 50 when an RRC-connected UE 2 moves from a cell of the serving RNC (R1) 10 to a cell of a drift RNC (R2). The serving RNC (R1) 10 transmits an MBMS attach request message to the drift RNC (R2) in step S52. The MBMS attach request message includes information related to the moved UE 2 and the drift RNC (R2) adds an identifier of the moved UE to a list of RRC-connected UEs. The list of RRC-connected UEs 2 includes UE identifiers for each MBMS.

Upon receiving the MBMS attach request message for a specific UE 2, the drift RNC (R2) 10 determines whether a resource for maintaining the RRC-connected mode of the UE can be allocated. If a resource for maintaining the RRC-connected mode of the UE 2 can be allocated, the drift RNC (R2) 10 attaches the identifier of the UE to the list of RRC-connected UEs for the MBMS that the UE has joined and transmits an affirmative response to the serving RNC (R1) via an MBMS attach response message in step S54. On the other hand, if no radio resource is available, the drift RNC (R2) 10 rejects the request and transmits a negative response to the serving RNC (R1) in step S54.

Upon receiving the affirmative response in the MBMS attach response message, the serving RNC (R1) 10 maintains the RRC connection of the UE 2 in the new cell. The serving RNC (R1) 10 provides the drift RNC (R2) with MBMS data received from the core network 4 and the drift RNC (R2) transmits the MBMS data to the UE 2 via a point-to-point radio bearer.

FIG. 5 illustrates a conventional MBMS detach process 60 performed when a UE 2 in the RRC-connected mode moves from a cell managed by a first drift RNC (R2) 10 to a cell managed by another RNC, for example a second drift RNC (not shown). The serving RNC (R1) 10 transmits an MBMS detach request message for the UE 2 to the first drift RNC (R2) in step S62. The MBMS detach request message includes an identifier of the previous cell where the UE 2 was located before moving, for example the cell managed by the first drift RNC (R2) 10, as well as the MBMS ID and the identifier (RNTI) of the moved UE 2.

The first drift RNC (R2) 10 removes the moved UE 2 from a list of UEs in the RRC-connected mode. The first drift RNC (R2) 10 may transmit a response to the serving RNC (R1) via an MBMS detach response message in step S64.

According to the conventional methods illustrated in FIGS. 4 and 5, the serving RNC (R1) 10 transmits one MBMS attach request message or one MBMS detach request message to a drift RNC (R2) for each UE 2 per joined MBMS. More specifically, when the serving RNC (R1) 10 transmits an MBMS attach request message or an MBMS detach request message to the drift RNC (R2), one request message is transmitted for each specific MBMS among a plurality of such services that a specific UE 2 may have joined.

If a UE 2 joins more than one MBMS and if several such services are in progress, the MBMS attach and MBMS detach request messages are transmitted a corresponding number of times, for example once for each service in progress for a given UE. Furthermore, if several UEs 2 join one MBMS and several of the joined UEs move from the cell managed by the serving RNC (R1) 10 to a cell managed by a drift RNC (R2) while the MBMS is not in progress, the serving RNC (R1) transmits MBMS attach messages several times to each joined UE upon receiving a session start command for the MBMS.

When the conventional methods are performed, the frequency of MBMS attach/detach request message transmission increases according to the number of mobile terminals joining an MBMS and according to the number of such services provided. Therefore, the signaling load between the serving RNC and the drift RNCs increases and the efficiency of network resources is reduced accordingly whenever a mobile terminal moves to a cell managed by a new drift RNC. Therefore, there is a need for a method and apparatus that facilitates providing an MBMS to a mobile terminal that moves to a cell managed by a new drift RNC while minimizing the corresponding increase in the signaling load between the serving RNC and drift RNC and maintaining the efficiency of network resources. The present invention addresses these and other needs.

SUMMARY OF THE INVENTION

The present invention relates to a method and apparatus for providing a point-to-multipoint service to a mobile terminal that moves from an area managed by one network controller, for example a serving RNC, to an area managed by another network controller, for example a drift RNC. Specifically, the present invention is directed to a method and apparatus for providing one or more MBMS such that, when one or more UE move to a new area of a mobile communication system managed by a different network element after joining the MBMS, information is transmitted between network elements in a manner that facilitates the continued reception of the services by the UEs that have moved while conserving network resources and increasing efficiency of the mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method and apparatus that provides information to a second network controller regarding one or more mobile terminals that have moved to an area managed by the second network controller from an area managed by a first network controller and facilitates continuing to provide point-to-multipoint services to the mobile terminals that have moved while minimizing the increase in signaling activity between the first network controller and second network controller. Specifically, a serving RNC provides an attach request message including list information to a drift RNC when one or more mobile terminals move from an area managed by the serving RNC to an area managed by the drift RNC, the information indicating either point-to-multipoint services that a specific mobile terminal has joined or mobile terminals that have joined a specific point-to-multipoint service.

In one aspect of the invention, a method is provided for providing one or more point-to-multipoint services to a specific mobile terminal. The method includes transmitting a service attach request message identifying services the specific mobile terminal has joined from a first network controller to a second network controller when the specific mobile terminal moves from a cell managed by the first network controller to a cell managed by the second network controller and performing a service attach process for the specific mobile terminal according to information in the attach request message and for each point-to-multipoint service identified in the attach request message.

Preferably, the service attach process is performed in the second network controller and is performed only if a connection for exchanging control data with a core network via the second network controller is available. Preferably, the first network controller and second network controller are part of a universal mobile telecommunications system.

It is contemplated that the information in the service attach request message may indicate which point-to-multipoint services are in progress for the specific mobile terminal. It is further contemplated that the information in the service attach request message may indicate which point-to-multipoint services are not in progress for the specific mobile terminal.

Preferably, the service attach request message includes an identifier of the cell managed by the second network controller and an identifier of the specific mobile terminal. It is contemplated that the service attach process may include adding the identifier of the specific mobile terminal to a list of connected mobile terminals managed by the second network controller for each of the services identified in the attach request message and the list of connected mobile terminals indicates which mobile terminals have a connection for exchanging control data with a core network via the second network controller.

It is contemplated that the method may include transmitting a service detach request message including information identifying each point-to-multipoint service the specific mobile terminal has joined from the first network controller to the second network controller upon the specific mobile terminal leaving the cell managed by the second network controller and performing a service detach process in the second network controller according to the information in the detach request message for each of the services identified in the detach request message that are in progress for the specific mobile terminal. Preferably, the service detach process is performed only if a connection for exchanging control data with a core network via a third network controller is available in the cell to which the mobile terminal has moved.

Preferably, the service detach request message includes an identifier of the cell to which the mobile terminal has moved and an identifier of the specific mobile terminal. It is contemplated that the service detach process may include removing the identifier of the specific mobile terminal from a list of connected mobile terminals managed by the second network controller for each of the services identified in the detach request message.

In another aspect of the invention, a method is provided for providing a specific point-to-multipoint service to one or more mobile terminals. The method includes transmitting a service attach request message from a first network controller to a second network controller identifying each mobile terminal that has joined the specific point-to-multipoint service and moved from a cell managed by the first network controller to a cell managed by the second network controller and performing a service attach process for the specific point-to-multipoint service according to information in the attach request message and for each mobile terminal identified in the attach request message.

Preferably, the service attach process is performed in the second network controller and is performed only if a connection for exchanging control data with a core network via the second network controller is available. Preferably, the first network controller and second network controller are part of a universal mobile telecommunications system.

It is contemplated that the information in the service attach request message may identify mobile terminals which moved from the cell managed by the first network controller to the cell managed by the second network controller when the specific service was not in progress. It is further contemplated that the service attach request message may be transmitted upon receiving a session start command for the specific service from a core network or transmitted prior to receiving a session start command for the specific service from the core network. Moreover, the information in the service attach request message may identify mobile terminals which moved from the cell managed by the first network controller to the cell managed by the second network controller when the specific point-to-multipoint service was in progress.

Preferably, the service attach request message includes an identifier of the cell managed by the second network controller and an identifier of the specific service. It is contemplated that the service attach process may include adding mobile terminals identified by the attach request message to a list of connected mobile terminals managed by the second network controller for the specific service and the list of connected mobile terminals indicates which mobile terminals have a connection for exchanging control data with a core network via the second network controller.

It is contemplated that the method may include transmitting a service detach request message including information identifying mobile terminals that have left the cell managed by the second network controller from the first network controller to the second network controller and performing a service detach process in the second network controller according to the information in the detach request message for each of the mobile terminals identified in the detach request message. Preferably, the service detach process is performed only if a connection for exchanging control data with a core network via a third network controller is available in the cell to which the mobile terminal has moved.

Preferably, the service detach request message includes an identifier of the cell to which the mobile terminals have moved and an identifier of the mobile terminals that have moved. It is contemplated that the service detach process may include removing the identifier of the mobile terminals that have moved from a list of connected mobile terminals managed by the second network controller for the specific service.

In another aspect of the invention, a system is provided for providing one or more point-to-multipoint services to a specific mobile terminal. The system includes a core network providing one or more point-to-multipoint services, a first network controller interfacing with the core network and managing one or more cells, a second network controller interfacing with the core network and managing one of more different cells and a specific mobile terminal.

The first network controller provides the point-to-multipoint services to the specific mobile terminal when the specific mobile terminal is located in a cell that it manages and transmits a service attach request message including information identifying each service the specific mobile terminal has joined to the second network controller when the specific mobile terminal moves from a cell managed by the first network controller to a cell managed by the second network controller. The second network controller receives the attach request message and performs a service attach process according to the information in the attach request message for each service identified in the attach request message.

It is contemplated that the information in the service attach request message may indicate which point-to-multipoint services are in progress for the specific mobile terminal. It is further contemplated that the information in the service attach request message may indicate which point-to-multipoint services are not in progress for the specific mobile terminal. Preferably, the service attach process is performed only if a connection for exchanging control data with a core network via the second network controller is available.

Preferably, the service attach request message includes an identifier of the cell managed by the second network controller and an identifier of the specific mobile terminal. It is contemplated that the service attach process may include adding the identifier of the specific mobile terminal to a list of connected mobile terminals managed by the second network controller for each of the services identified in the attach request message.

It is contemplated that the first network controller may transmit a service detach request message including information identifying each point-to-multipoint service the specific mobile terminal has joined to the second network controller upon the specific mobile terminal leaving the cell managed by the second network controller and the second network controller may perform a service detach process according to the information in the detach request message for each of the services identified in the detach request message that are in progress for the specific mobile terminal. Preferably, the service detach process is performed only if a connection for exchanging control data with a core network via a third network controller is available in the cell to which the mobile terminal has moved.

Preferably, the service detach request message includes an identifier of the cell to which the mobile terminal has moved and an identifier of the specific mobile terminal. It is contemplated that the service detach process may include removing the identifier of the specific mobile terminal from a list of connected mobile terminals managed by the second network controller for each of the services identified in the detach request message.

In another aspect of the invention, a system is provided for providing a specific point-to-multipoint service to one or more mobile terminals. The system includes a core network providing the specific point-to-multipoint service, a first network controller interfacing with the core network and managing one or more cells, a second network controller interfacing with the core network and managing one of more different cells and one or more mobile terminals.

The first network controller provides the specific point-to-multipoint service to mobile terminals located in a cell that it manages and transmits a service attach request message to the second network controller including information identifying mobile terminals that joined the specific service and moved from a cell managed by the first network controller to a cell managed by the second network controller. The second network controller receives the attach request message and performs a service attach process for the specific service according to the information in the attach request message for each mobile terminal identified in the attach request message.

It is contemplated that the information in the service attach request message may identify mobile terminals which moved from the cell managed by the first network controller to the cell managed by the second network controller when the specific service was not in progress. It is further contemplated that the service attach request message may be transmitted upon receiving a session start command for the specific service from a core network or transmitted prior to receiving a session start command for the specific service from the core network. Moreover, the information in the service attach request message may identify mobile terminals which moved from the cell managed by the first network controller to the cell managed by the second network controller when the specific service was in progress.

Preferably, the service attach request message includes an identifier of the cell managed by the second network controller and an identifier of the specific service. It is contemplated that the service attach process may include adding mobile terminals identified by the attach request message to a list of connected mobile terminals managed by the second network controller for the specific service. Preferably, the service attach process is performed only if a connection for exchanging control data with a core network via the second network controller is available.

It is contemplated that the first network controller may transmit a service detach request message to the second network controller including information identifying mobile terminals that have left the cell managed by the second network controller and the second network controller may perform a service detach process according to the information in the in the detach request message for each of the mobile terminals identified in the detach request message. Preferably, the service detach process is performed only if a connection for exchanging control data with a core network via a third network controller is available in the cell to which the mobile terminal has moved.

Preferably, the service detach request message includes an identifier of the cell to which the mobile terminals have moved and an identifier of the mobile terminals that have moved. It is contemplated that the service detach process may include removing the identifier of the mobile terminals that have moved from a list of connected mobile terminals managed by the second network controller for the specific service.

In another aspect of the invention, a radio network subsystem is provided for providing one or more point-to-multipoint services to a specific mobile terminal. The radio network subsystem includes a transmitter, a receiver, a storage unit and a controller.

The transmitter transmits a point-to-multipoint service attach request message to a second radio network subsystem. The receiver receives messages from the second radio network subsystem. The storage unit stores information identifying each point-to-multipoint service the specific mobile terminal has joined. The controller performs the methods of the present invention to manage the specific mobile terminal within a designated area, determine when the specific mobile terminal moves from the designated area to an area managed by the second radio network subsystem and generate the service attach request message including information identifying each service the specific mobile terminal has joined.

In another aspect of the invention, a radio network subsystem is provided for providing a specific point-to-multipoint service to one or more mobile terminals. The radio network subsystem includes a transmitter, a receiver, a storage unit and a controller.

The transmitter transmits a point-to-multipoint service attach request message to a second radio network subsystem. The receiver receives messages from the second radio network subsystem. The storage unit stores information identifying mobile terminals that have moved from a designated area managed by the radio network subsystem to an area managed by the second radio network subsystem. The controller performs the methods of the present invention to manage the mobile terminals within the designated area, determine which mobile terminals have joined the specific point-to-multipoint service and moved from the designated area to the area managed by the second radio network subsystem and generate the service attach request message including information identifying each mobile terminal that has joined the specific point-to-multipoint service and moved from the designated area to the area managed by the second radio network subsystem.

In another aspect of the invention, a radio network subsystem is provided for providing one or more point-to-multipoint services to a specific mobile terminal. The radio network subsystem includes a transmitter, a receiver, a storage unit and a controller.

The transmitter transmits messages to a second radio network subsystem. The receiver receives a point-to-multipoint service attach request message from the second radio network subsystem. The storage unit stores information identifying each service the specific mobile terminal has joined. The controller performs the methods of the present invention to manage the specific mobile terminal within a designated area, process a service attach request message including information identifying services the specific mobile terminal has joined and perform a service attach process for the specific mobile terminal according to the information in the attach request message and for each service identified in the attach request message.

In another aspect of the invention, a radio network subsystem is provided for providing a specific point-to-multipoint service to one or more mobile terminals. The radio network subsystem includes a transmitter, a receiver, a storage unit and a controller.

The transmitter transmits messages to a second radio network subsystem. The receiver receives a point-to-multipoint service attach request message from the second radio network subsystem. The storage unit stores information identifying mobile terminals that have moved from an area managed by the second radio network subsystem to a designated area managed by the radio network subsystem. The controller performs the methods of the present invention to manage the mobile terminals within the designated area, process the service attach request message including information identifying mobile terminals that have joined the specific service and moved from the area managed by the second radio network subsystem to the designated area and perform a service attach process for the specific service according to the information in the attach request message and for each mobile terminal identified in the attach request message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates a conventional transmission of a specific MBMS transmitted to one mobile terminal in a multicast mode.

DETAILED DESCRIPTION OF THE INVENTION

The present invention is directed to a method and apparatus for providing a point-to-multipoint service to a mobile terminal that moves from an area managed by one network controller to an area managed by another network controller. Although the present invention is illustrated with respect to a mobile terminal, it is contemplated that the present invention may be utilized anytime it is desired to provide a point-to-multipoint service to a device that moves from an area managed by a first controller to an area managed by a second controller.

Reference will now be made in detail to the preferred embodiments of the present invention, examples of which are illustrated in the accompanying drawings. Wherever possible, the same reference numbers will be used throughout the drawings to refer to the same or like parts.

Information identifying all services, for example MBMS, that a specific UE 2 has joined is herein referred to as MBMS list information. The MBMS list information may identify the services that are in progress or the services that are not in progress among those services the specific UE 2 has joined.

Information identifying each UE 2 among those UEs that have joined a specific MBMS which has moved to a cell managed by a different RNC 10 is herein referred to as UE list information. The UE list information may identify UEs that have joined a specific MBMS which was not in progress at the time the UEs moved or a specific MBMS which was in progress at the time the UEs moved.

In one embodiment of the present invention, a drift RNC (R2) 10 receives an MBMS attach request message from the serving RNC (R1) and determines whether MBMS list information or UE list information is included therein. If MBMS list information was received, the drift RNC (R2) 10 performs an MBMS attach process corresponding to a specific UE 2 for each MBMS listed. If UE list information was received, the drift RNC (R2) 10 performs an MBMS attach process corresponding to a specific MBMS for each UE 2 listed.

Figure 6:
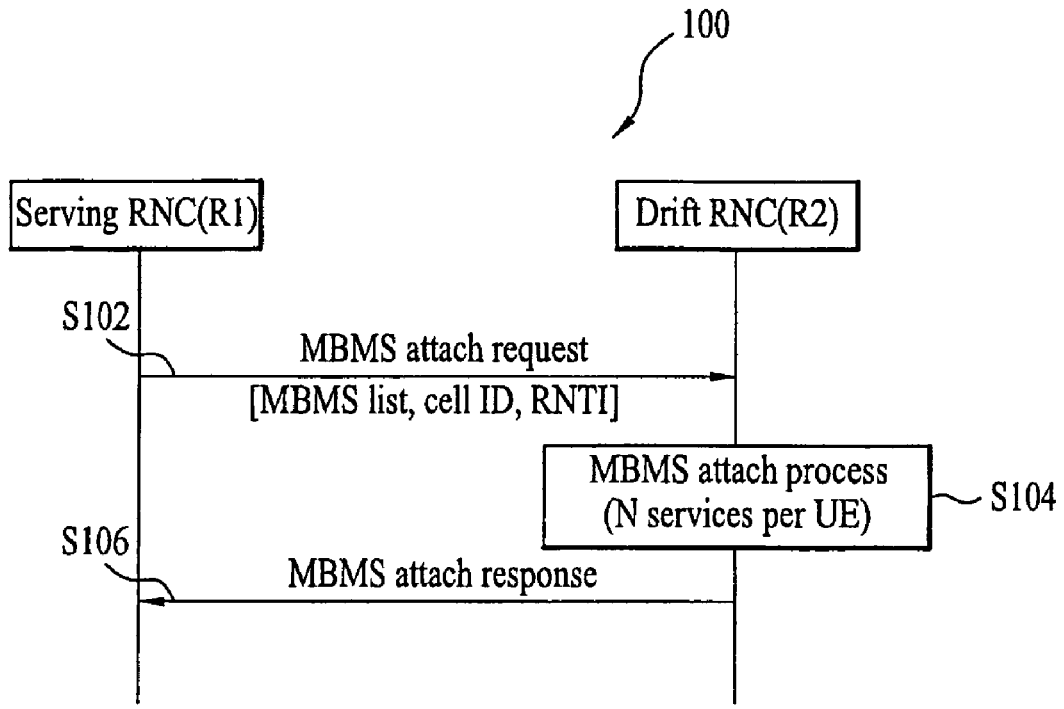
FIG. 6 illustrates an MBMS attach process according to one embodiment of the present invention.

FIG. 6 illustrates an MBMS transmission method 100 whereby the serving RNC (R1) 10 transmits an MBMS attach request message including MBMS list information to a drift RNC (R2) when a UE 2 moves to an area managed by the drift RNC (R2). Preferably, the MBMS list information indicates each MBMS that is in progress for the UE 2.

In step 102, the serving RNC (R1) 10 senses the movement of the UE 2 to a cell managed by the drift RNC (R2) and transmits an MBMS attach request message including the MBMS list information to the drift RNC (R2). The MBMS attach request message may include information identifying the cell to which the UE 2 has moved and a UE identifier such as RNTI.

Figure 1:
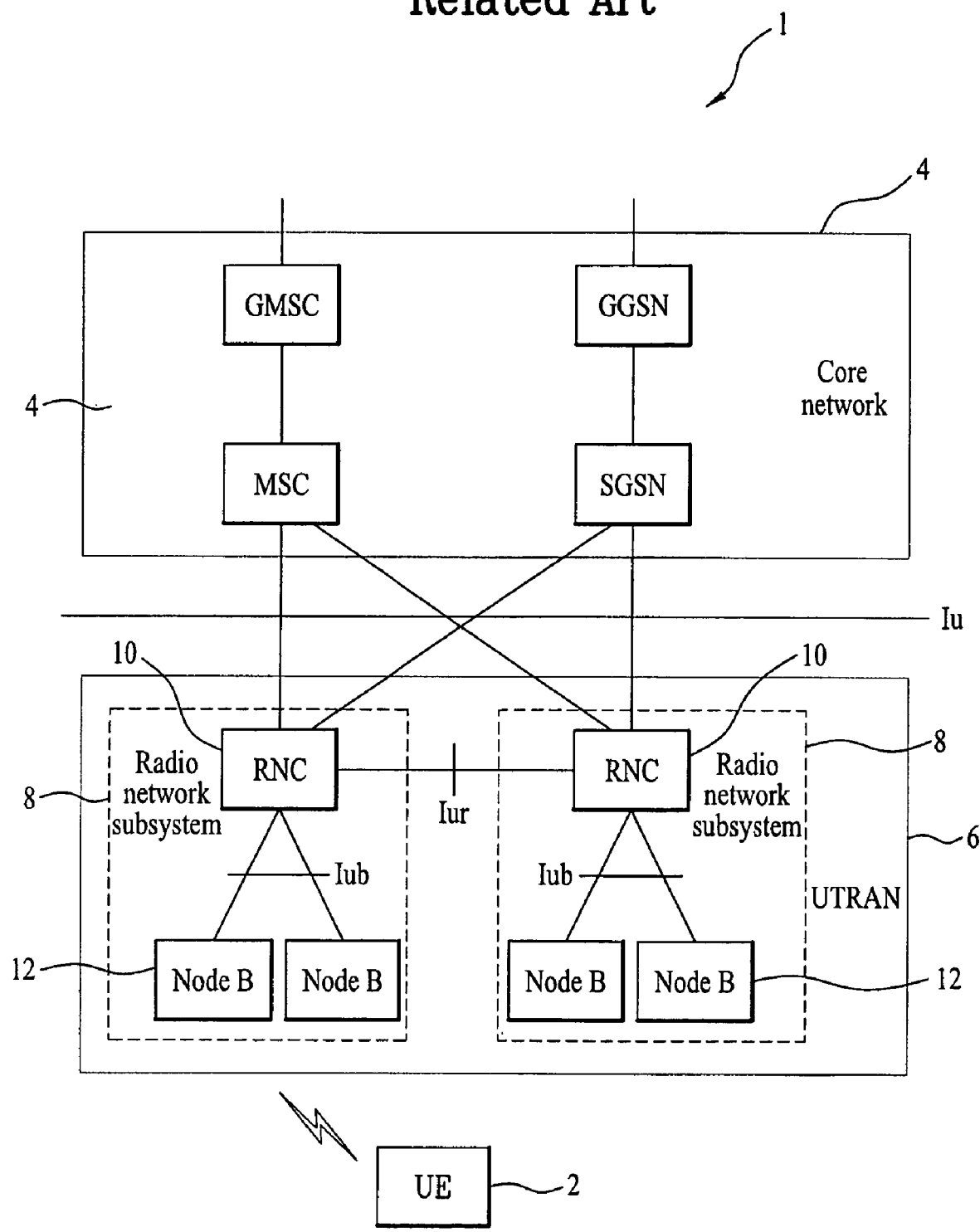
FIG. 1 illustrates a block diagram of a conventional UMTS network structure.
Figure 2A:
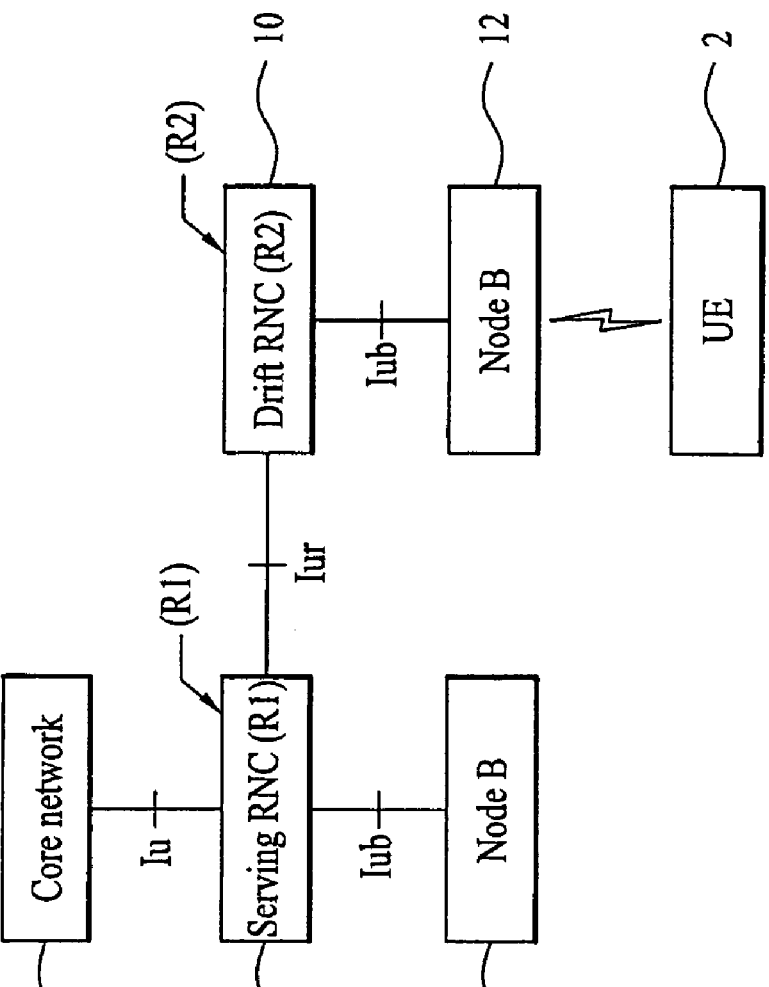
FIG. 2A illustrates a block diagram of a portion of the UMTS network of FIG. 1 showing a mobile terminal connected to the UTRAN via a serving RNC alone.
Figure 2B:
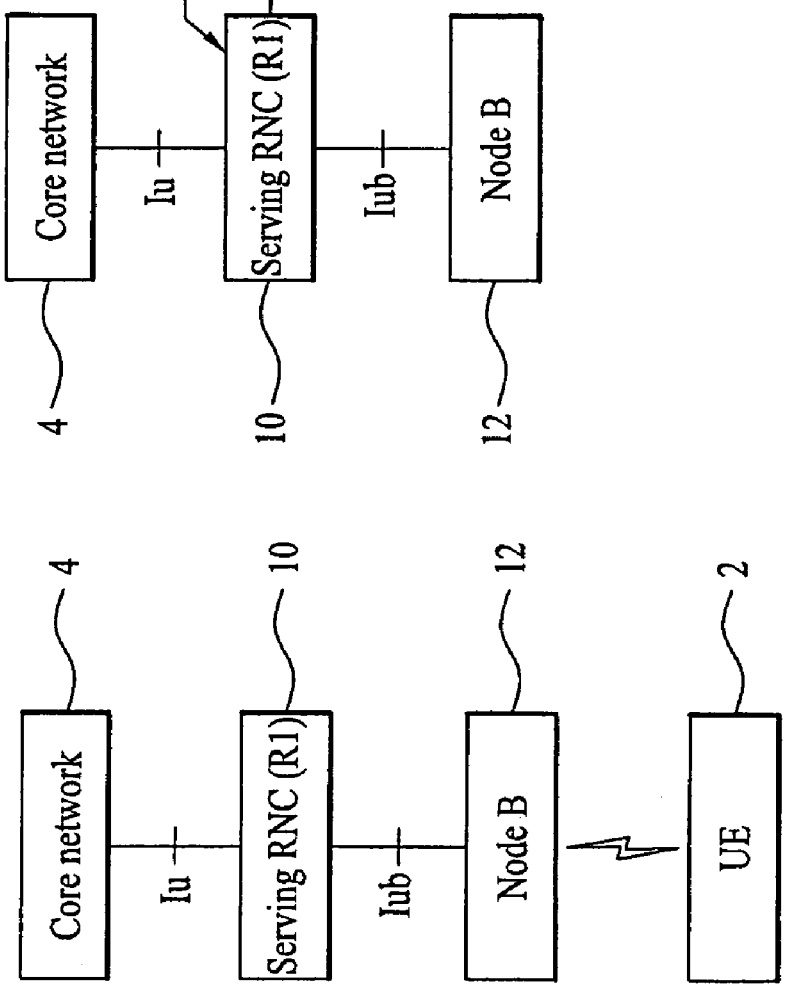
FIG. 2B illustrates a block diagram of a portion of the UMTS network of FIG. 1 showing a mobile terminal connected to the UTRAN via a drift RNC and a serving RNC.
Figure 4:
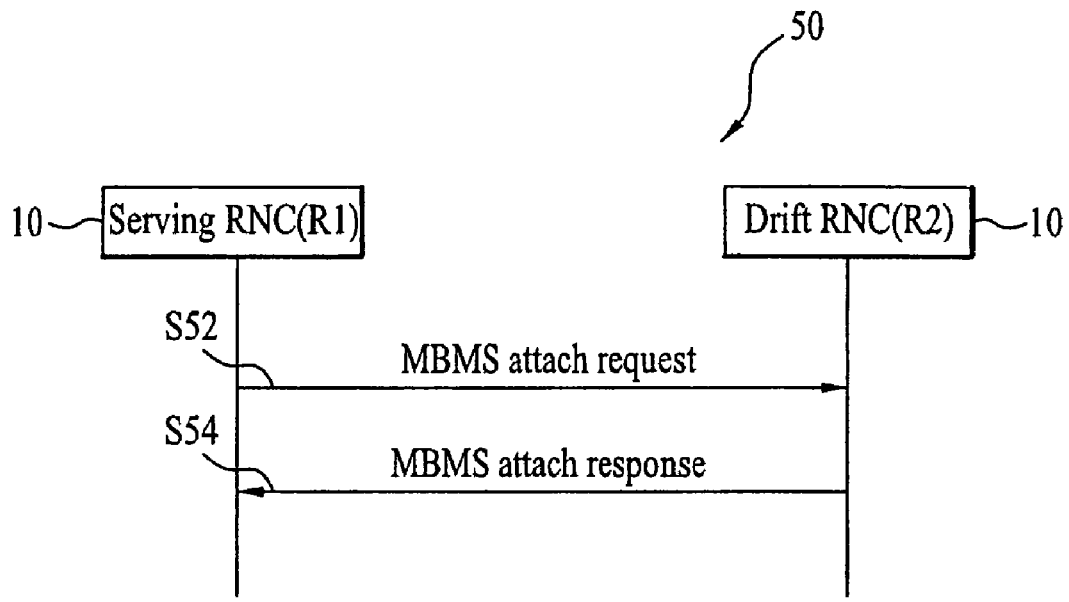
FIG. 4 illustrates a conventional MBMS attach process.
Figure 5:
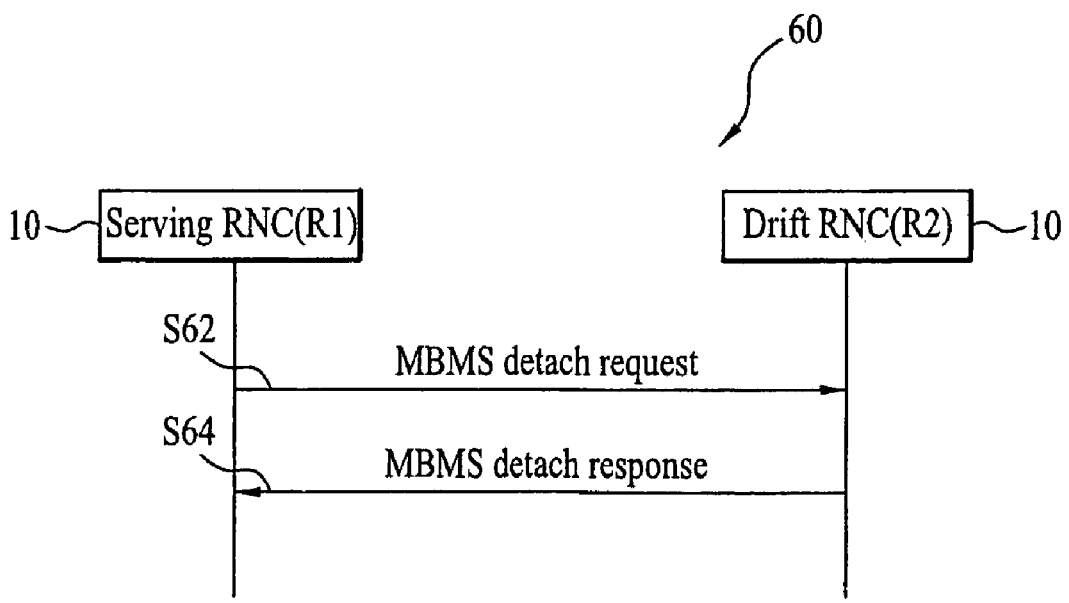
FIG. 5 illustrates a conventional MBMS detach process.

Upon receiving the MBMS attach request message, the drift RNC (R2) 10 confirms the MBMS list information and performs an MBMS attach process in step S104 by adding the UE 2 to a list of RRC-connected UEs managed by the drift RNC (R2) for each MBMS identified by the MBMS list information. For example, if the MBMS list information indicates 'N' services, the UE 2 is added to the list of RRC-connected UEs managed by the drift RNC (R2) 10 for each of the 'N' services such that a single transmission of an MBMS attach request message achieves the effect of 'N' transmissions performed according to the conventional method illustrated in FIG. 4.

The MBMS attach process in step S104 is performed only if there is a resource allocation for maintaining an RRC connection for the corresponding UE 2 in the cell managed by the drift RNC (R2) 10. In step S106, the drift RNC (R2) 10 transmits an MBMS attach response message to the serving RNC (R1). The MBMS attach response message may include MBMS list information.

Figure 7:
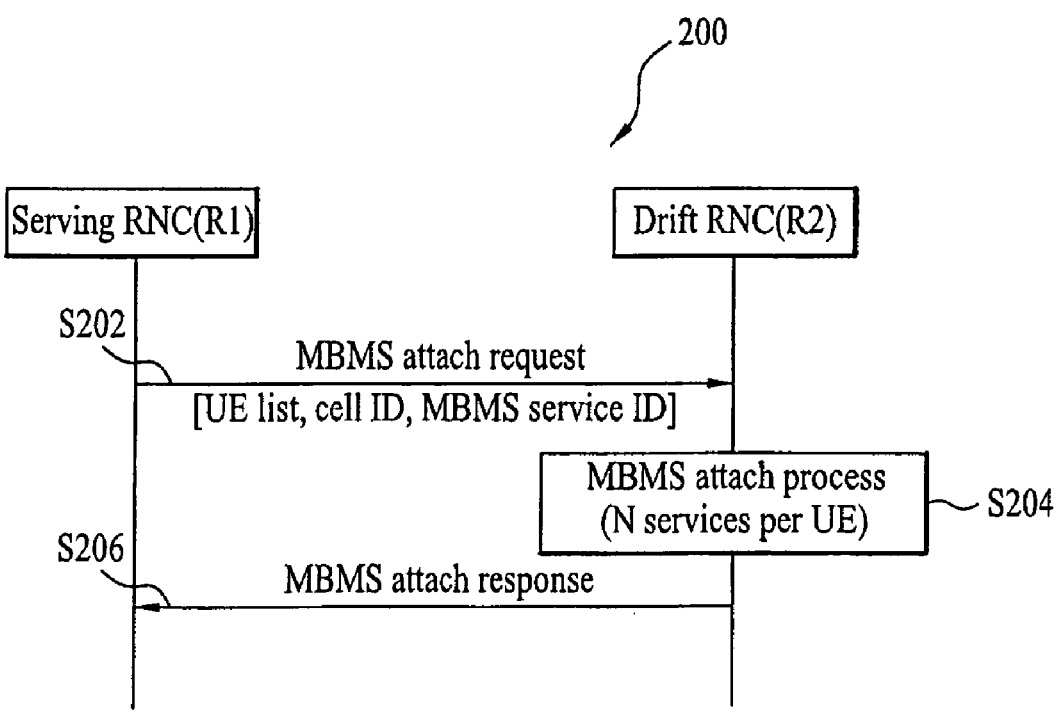
FIG. 7 illustrates an MBMS attach process according to another embodiment of the present invention.

FIG. 7 illustrates an MBMS transmission method 200 whereby the serving RNC (R1) 10 transmits an MBMS attach request message including UE list information to a drift RNC (R2) when one or more UEs 2 which have joined a specific MBMS move to an area managed by the drift RNC (R2). Preferably, the MBMS list information indicates UEs 2 that have joined a specific MBMS which was not in progress at the time the UEs moved.

In step 202, the serving RNC (R1) 10 transmits an MBMS attach request message including the UE list information for the specific MBMS to the drift RNC (R2) 10. The MBMS attach request message may include information identifying the cell to which the UE 2 has moved and the specific MBMS as well as the UE list information identifying which of the UEs 2 having joined the specific MBMS have moved to the cell managed by the drift RNC (R2) 10. Preferably, the MBMS attach request message is transmitted upon receiving a "session start" command from the core network 4 for a specific MBMS that was not in progress when a UE 2 moved to a cell managed by the drift RNC (R2).

Upon receiving the MBMS attach request message, the drift RNC (R1) 10 confirms the UE list information and performs an MBMS attach process in step S204 by adding the UEs 2 indicated in the UE list information to a list of RRC-connected UEs managed by the drift RNC (R2) for the specific MBMS. For example, if the UE list information indicates 'M' UEs 2, the 'M' UEs are added to the list of RRC-connected UEs for the specific MBMS, such that a single transmission of an MBMS attach request message achieves the effect of 'M' transmissions performed according to the conventional method illustrated in FIG. 4.

The MBMS attach process in step S204 is performed only if there is a resource allocation for maintaining an RRC connection for the corresponding UE 2 in the cell managed by the drift RNC (R2) 10. In step S206, the drift RNC (R2) 10 transmits an MBMS attach response message to the serving RNC (R1). The MBMS attach response message may include. UE list information.

Figure 8:
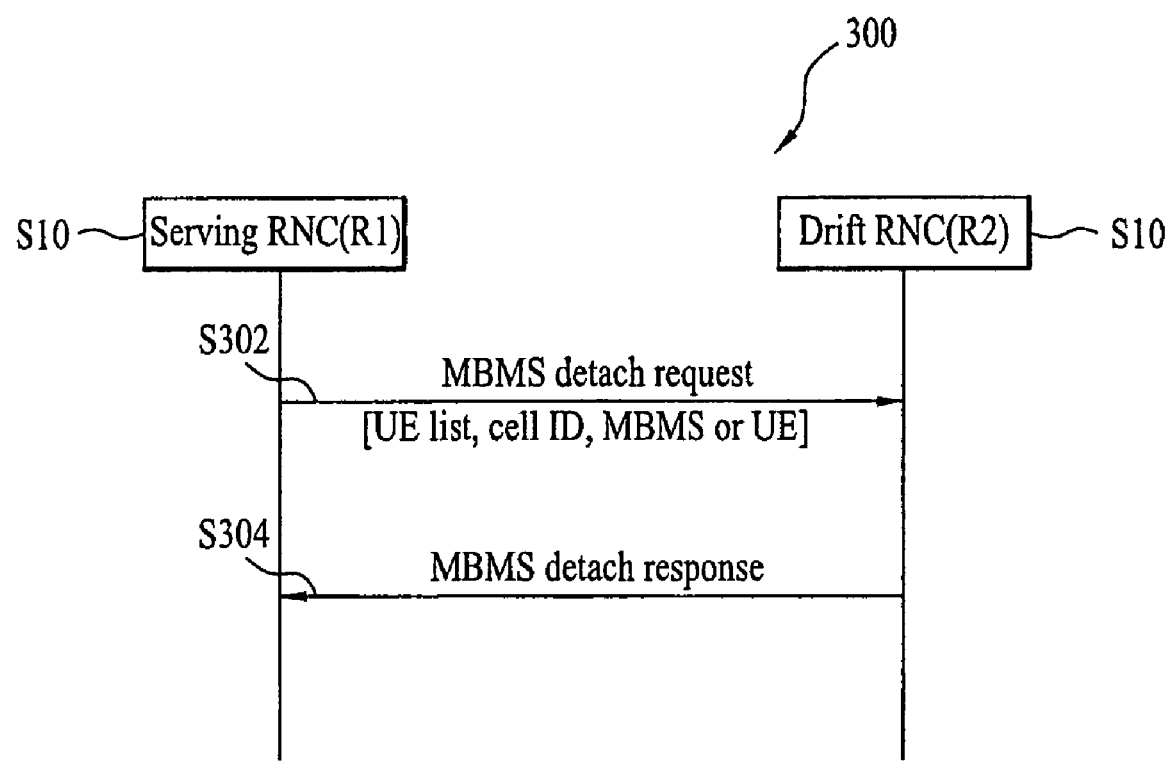
FIG. 8 illustrates an MBMS detach process according to one embodiment of the present invention.

FIG. 8 illustrates an MBMS detach process according to one embodiment of the present invention. The MBMS detach process is performed when a UE 2 in the RRC-connected mode moves from a cell managed by a first drift RNC (R2) 10 into a cell managed by another RNC, for example a second drift RNC (not shown).

The serving RNC (R1) 10 transmits an MBMS detach request message to the first drift RNC (R2) in step S202. The MBMS detach request message includes information indicating one or more UEs 2 which have moved to a cell managed by the second drift RNC (not shown) 10. The MBMS detach request message may also include information identifying the cell to which the UEs 2 have moved and information identifying specific UEs or MBMS.

Upon receiving the MBMS detach request message, the first drift RNC (R2). 10 removes the UEs 2 indicated by the MBMS detach request message from a list of RRC-connected UEs managed for each MBMS in step S204. The first drift RNC (R2) 10 may transmit a response to the serving RNC (R1) via an MBMS detach response message in step S206.

Figure 9:
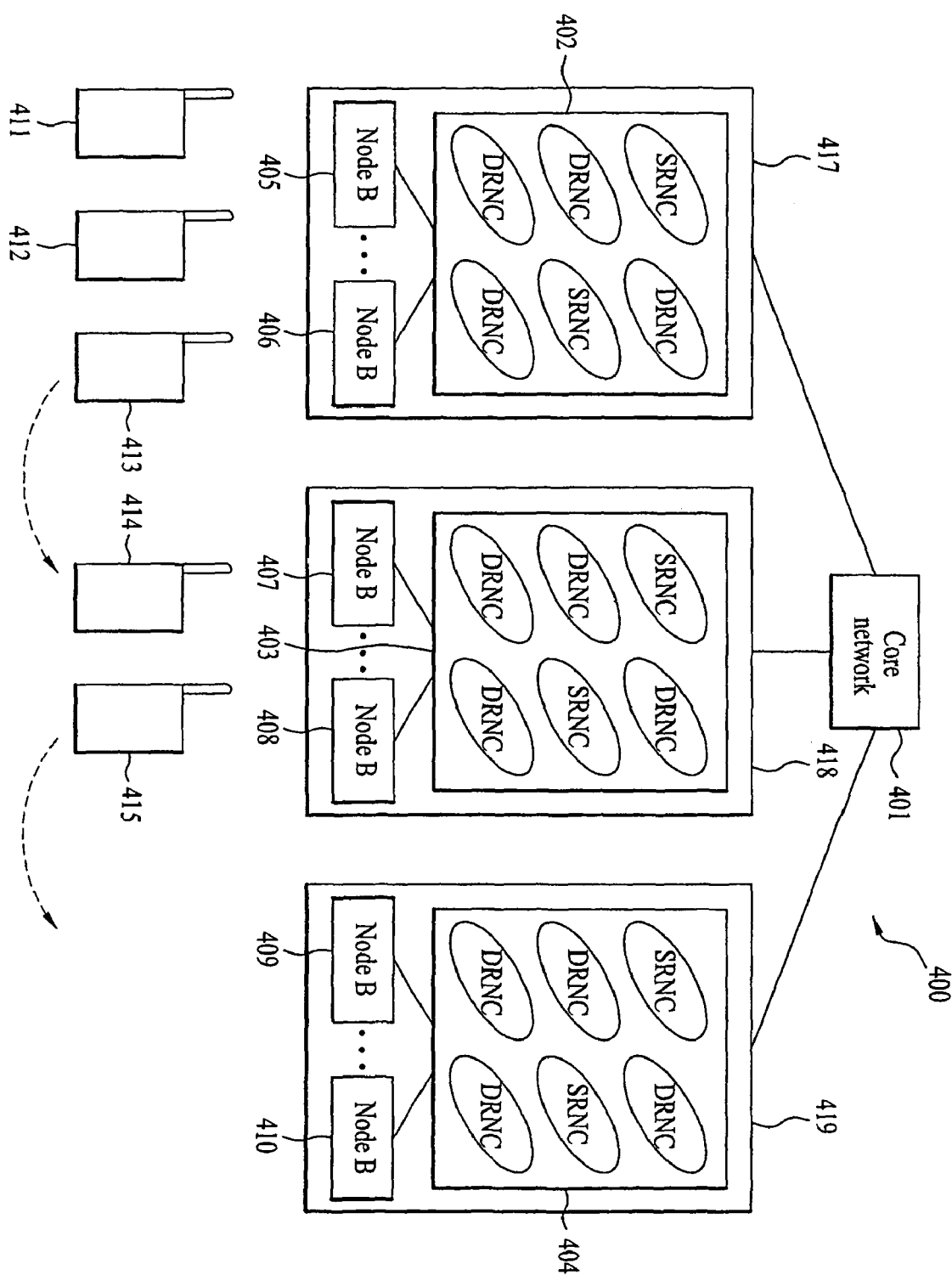
FIG. 9 illustrates a communication system according to one embodiment the present invention.

FIG. 9 illustrates a communication network 400 according to one embodiment of the present invention. The communication network 400 includes a core network 401 providing one or more MBMS, a plurality of UEs 411-415, and radio network subsystems 417-419 connecting the UEs to the core network. The radio network subsystems 417-419 respectively include RNCs 402-404 as network elements responsible for allocation and management of radio resources to the UEs 411-415 according to MBMS area and Node-Bs 405-410 for communicating with the UEs. Each UE 411-415 may join one or more MBMS and only a portion of the MBMS may be in progress for a given UE at anytime.

The first network element 402, acting as a serving RNC (SRNC) for the UEs 411-415 in its management area, determines when one or more the UEs move from the area that it manages to the area managed by a second RNC 403. As illustrated in FIG. 8, two UEs 414, 415 move from the area managed by the first RNC 402 to the area managed by the second RNC 403. Although two UEs 414, 415 of the five UEs 411-415 managed by the first RNC 402 are illustrated in FIG. 8 as moving to an area managed by the second RNC 403, the methods and apparatus of the present invention are applicable to any number of UEs managed by any number of RNCs that move to an area managed by a different RNC.

The first RNC 402 transmits list information related to services that the moved UEs 414, 415 have joined. The list information may be MBMS list information indicating each MBMS that a specific moved UE 414 or 415 has joined or UE list information indicating each UE 414 and/or 415 that has joined a specific MBMS and moved. The list information is transmitted as part of an MBMS attach request message.

The MBMS list information may identify the services that are in progress or the services that are not in progress among those services that a specific moved UE 414 or 415 has joined. On the other hand, the UE list information may indicate which of the moved UEs 414 and/or 415 are receiving a specific MBMS among those having joined the specific MBMS, for example for an MBMS in progress, or may indicate which of the moved UEs are not receiving the specific MBMS among those having joined the specific MBMS, for example for an MBMS for which no session start has been received.

Preferably, the MBMS attach request message is transmitted each transmission time interval (TTI) which is the shortest possible interval for updating an RRC-connected UE list managed by the second RNC 403. The second RNC 403, acting as a drift RNC (DRNC) for the UEs 414, 415 that have moved from the area managed by the first RNC 402, utilizes the list information to perform an MBMS attach process.

If MBMS list information is included in the MBMS attach request message, the MBMS attach process is performed for each MBMS indicated for a specific UE 414 or 415. If UE list information is included in the MBMS attach request message, the MBMS attach process is performed for each UE 414 and/or 415 indicated for a specific MBMS.

The second RNC 403 confirms the MBMS list information or UE list information included in the MBMS attach request message. Upon confirming the MBMS list information or UE list information, the second RNC 403 either adds the specific UE 414 or 415 to a list of connected UEs maintained for each MBMS indicated by the MBMS list information or adds the UEs 414 and/or 415 indicated by the UE list information to a list of connected UEs maintained for the specific MBMS. The list of connected UEs indicates UEs in an RRC-connected mode for connecting an RRC layer of the second RNC 403 to that of a Node B 407 or 408.

If one or more of the UEs 414, 415 that moved from the area managed by the first RNC 402 to the area managed by the second RNC 403 subsequently move from the area managed by the second RNC to an area managed by the third RNC 404, an MBMS detach request message is transmitted from the first RNC to the second RNC. For each UE 414 and/or 415 indicated by the MBMS detach request message, the second RNC 403 performs an MBMS detach process.

The MBMS detach process performed by the second RNC 403 removes the indicated UEs 414 and/or 415 from the list of connected UEs managed by the second RNC for each MBMS. The MBMS detach request message may include information corresponding to that included in an MBMS attach request message.

Figure 10:
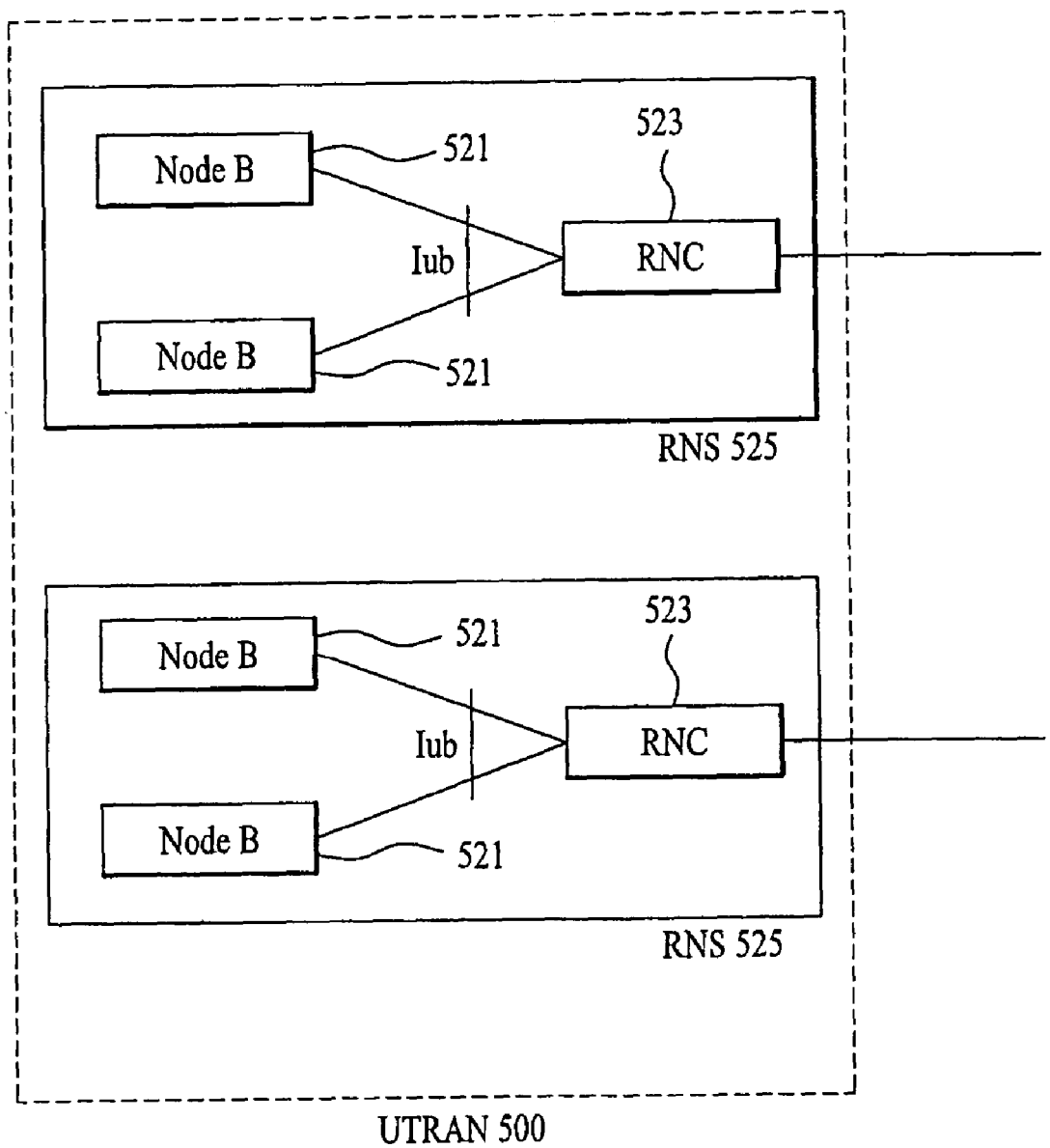
FIG. 10 illustrates a UTRAN for providing a point-to-multipoint service to a mobile terminal according to one embodiment of the present invention.

FIG. 10 illustrates a block diagram of a UTRAN 500 according to one embodiment of the present invention. The UTRAN 500 includes one or more radio network sub-systems (RNS) 525. Each RNS 525 includes a radio network controller (RNC) 523 and a plurality of Node-Bs (base stations) 521 managed by the RNC. The RNC 523 handles the assignment and management of radio resources and operates as an access point with respect to a core network 4. Furthermore, the RNC 523 is adapted to perform the methods of the present invention by performing the functions of a serving RNC or a drift RNC.

The Node-Bs 521 receive information sent by the physical layer of a mobile terminal 2 through an uplink, and transmit data to the mobile terminal through a downlink. The Node-Bs 521 operate as access points, or as a transmitter and receiver, of the UTRAN 500 for the mobile terminal 2.

As described above, according to the methods of the present invention, a serving RNC transmits one MBMS attach request message to a drift RNC including list information when one or more mobile terminals move from an area managed by the serving RNC to an area managed by the drift RNC. The list information may indicate one or more services that a specific mobile terminal has joined before moving or may indicate mobile terminals that have moved after joining a specific service. The drift RNC performs an MBMS attach process either for multiple services for each specific mobile terminal or for multiple mobile terminals for each specific service. Signaling message transmission between RNCs when a mobile terminal moves from an area managed by one RNC to an area managed by another RNC is minimized as well as the increase in the network load, thereby increasing efficiency of a network and conserving network resources.

It will be apparent to one skilled in the art that the preferred embodiments of the present invention can be readily implemented using, for example, a processor or other data or digital processing device, either alone or in combination with external support logic. It should be appreciated that the methods of the present invention may be implemented as a computer-readable program stored on such media as a CD-ROM, RAM, floppy disk, hard disk, or magneto-optical disk.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A method for performing a point-to-multipoint service attach process in a mobile communication network, the method comprising:

receiving a point-to-multipoint service attach request message, at a second network controller from a first network controller when a mobile terminal using at least one point-to-multipoint service which has been provided at a first cell moves from the first cell managed by the first network controller to a second cell managed by the second network controller, the point-to-multipoint service attach request message comprising a list indicating one or more point-to-multipoint services affected by the movement of the mobile terminal from the first cell to the second cell;

performing, at the second network controller, the point-to-multipoint service attach process for the mobile terminal according to the point-to-multipoint service attach request message, wherein the point-to-multipoint service attach process comprises adding one or more point-to-multipoint services identified in the point-to-multipoint service attach request message to a point-to-multipoint service list of the second network controller;

receiving, at the second network controller from the first network controller upon the mobile terminal leaving the second cell, a point-to-multipoint service detach request message comprising a list indicating one or more point-to-multipoint services affected by the leaving of the mobile terminal; and performing, at the second network controller, a point-to-multipoint service detach process for the mobile terminal according to the point-to-multipoint service detach request message, wherein the point-to-multipoint service detach process comprises removing each of the point-to-multipoint services in the list of the point-to-multipoint service detach request message from the point-to-multipoint service list of the second network controller.

2. The method of claim 1, wherein the point-to-multipoint service attach request message indicates which point-to-multipoint services are in progress for the mobile terminal in the first cell.

3. The method of claim 1, wherein the point-to-multipoint service attach request message indicates which point-to-multipoint services are not in progress for the mobile terminal in the first cell.

4. The method of claim 1, wherein the point-to-multipoint service attach request message further comprises an identifier of the second cell and an identifier of the mobile terminal.

5. The method of claim 4, wherein the point-to-multipoint service attach process further comprises adding the identifier of the mobile terminal to a list of connected mobile terminals managed by the second network controller for each of the point-to-multipoint services identified in the attach request message.

6. The method of claim 5, wherein a number of the identifier of the mobile terminal added to the connected mobile terminals managed by the second network controller is more than one.

7. The method of claim 1, wherein the point-to-multipoint service detach request message further comprises an identifier of the second cell that the mobile terminal has left and an identifier of the mobile terminal.

8. The method of claim 7, wherein the point-to-multipoint detach process further comprises removing the identifier of the mobile terminal from a list of connected mobile terminals managed by the second network controller for each of the point-to-multipoint service in the list of the point-to-multipoint service detach request message.

9. The method of claim 1, wherein the point-to-multipoint service detach process is performed only when the mobile terminal is in radio resource control (RRC) connected mode with an activated point-to-multipoint service.

10. The method of claim 1, wherein the point-to-multipoint service attach process is performed only when the mobile terminal is in radio resource control (RRC) connected mode with an activated point-to-multipoint service.

11. The method of claim 1, wherein the first network controller and second network controller are part of a universal mobile telecommunications system (UMTS).

12. A system for providing at least one point-to-multipoint service to a mobile terminal, the system comprising:
a first network controller managing at least a first cell;
a second network controller managing at least a second cell; and
the mobile terminal,
wherein, the first network controller is adapted to provide the at least one point-to-multipoint service to the mobile terminal when the mobile terminal is located in the first cell, and to transmit to the second network controller, when the mobile terminal moves from the first cell to a second cell, a point-to-multipoint service attach request message comprising a list indicating one or more point-to-multipoint services affected by the movement of the mobile terminal from the first cell to the second cell,
wherein the second network controller is adapted to receive the point-to-multipoint service attach request message and perform a point-to-multipoint service attach process by adding the one or more point-to-multipoint services in the list of the point-to-multipoint service attach request message to a point-to-multipoint service list of the second network controller;
wherein the first network controller is further adapted to transmit to the second network controller, upon the mobile terminal leaving the second cell, a point-to-multipoint service detach request message comprising a list indicating one or more point-to-multipoint services for the mobile terminal, and
the second network controller is further adapted to receive the point-to-multipoint service detach request message and perform a point-to-multipoint service detach process by removing the one or more point-to-multipoint services in the list of the point-to-multipoint service detach request message from the point-to-multipoint service list of the second network controller.

13. The system of claim 12, wherein the point-to-multipoint service attach request message indicates which point-to-multipoint services are in progress for the mobile terminal in the first cell.

14. The system of claim 12, wherein the point-to-multipoint service attach request message indicates which point-to-multipoint services are not in progress for the mobile terminal in the first cell.

15. The system of claim 12, wherein the point-to-multipoint service attach request message further comprises an identifier of the second cell and an identifier of the mobile terminal.

16. The system of claim 15, wherein the point-to-multipoint service attach process comprises adding the identifier of the mobile terminal to a list of connected mobile terminals managed by the second network controller for each of the point-to-multipoint services identified in the attach request message.

17. The system of claim 12, wherein the point-to-multipoint service detach request message further comprises an identifier of the second cell that the mobile terminal has left and an identifier of the mobile terminal.

18. The system of claim 17, wherein the point-to-multipoint service detach process comprises removing the identifier of the mobile terminal from a list of connected mobile terminals managed by the second network controller for each of the point-to-multipoint service in the list of the point-to-multipoint service detach request message.

19. The system of claim 17, wherein the second network controller is further adapted to perform the point-to-multipoint service detach process only when the mobile terminal is in radio resource control (RRC) connected mode with an activated point-to-multipoint service.

20. The system of claim 12, wherein the second network controller is further adapted to perform the point-to-multipoint service attach process only when the mobile terminal is in radio resource control (RRC) connected mode with an activated point-to-multipoint service.

* * * * *